Nov. 9, 1965
R. E. MOTTIN
3,216,631
AUTOMATIC FEEDER MECHANISM FOR ORIENTING
RELATIVELY SMALL ARTICLES
Original Filed Nov. 16, 1959
4 Sheets-Sheet 4
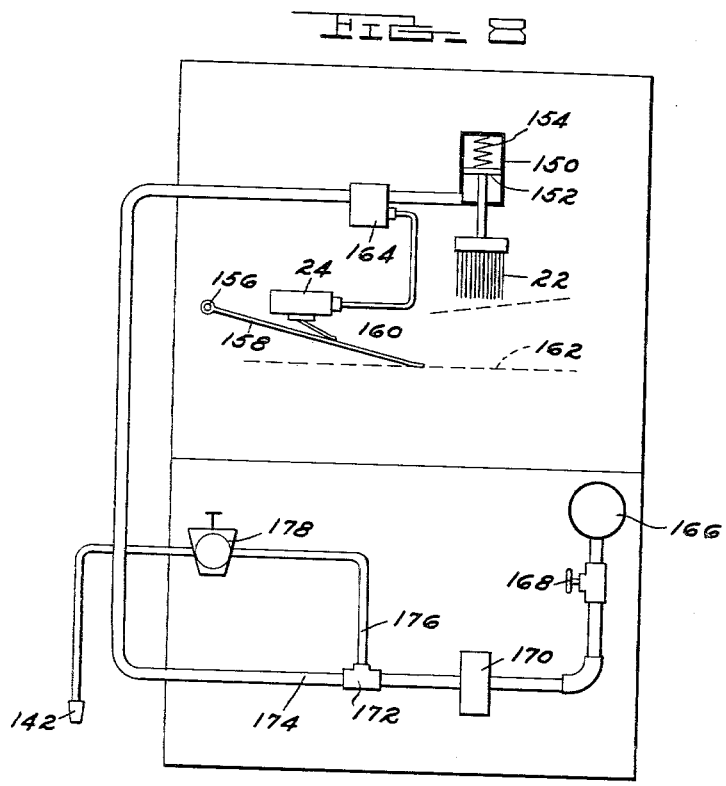
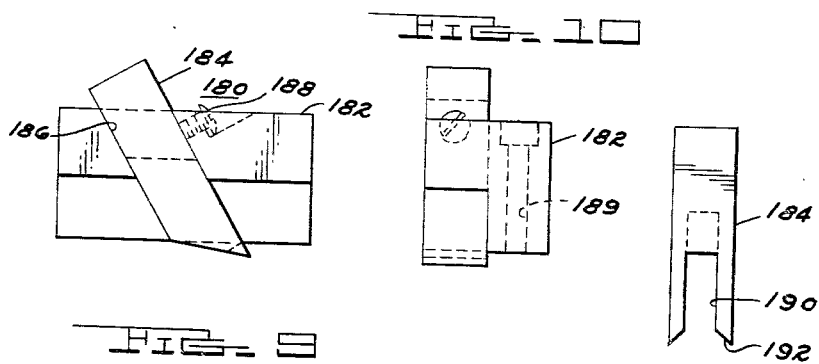
INVENTOR.
RALPH E. MOTTIN
BY
Barnes, Kisselle, Raisch & Choate
ATTORNEYS

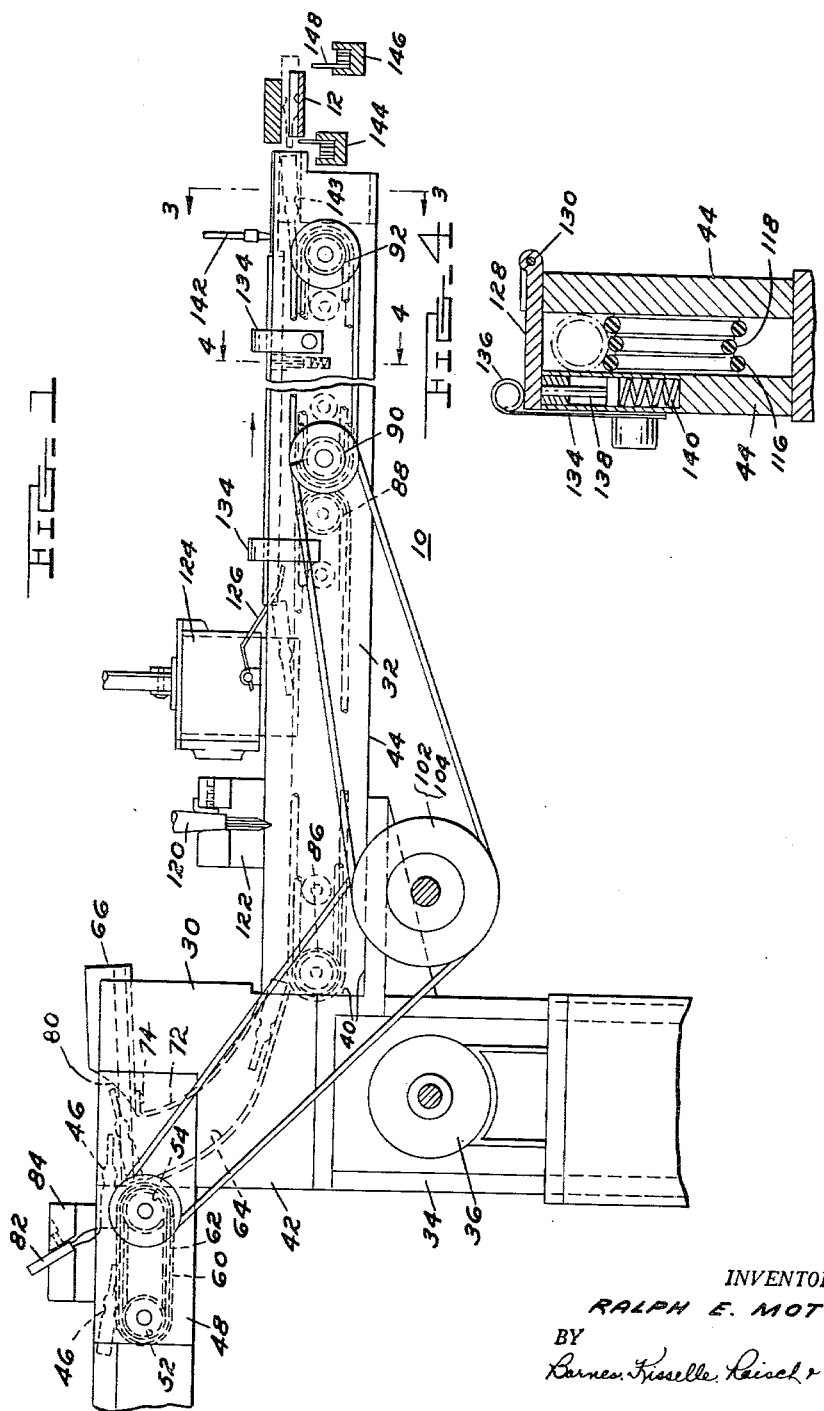

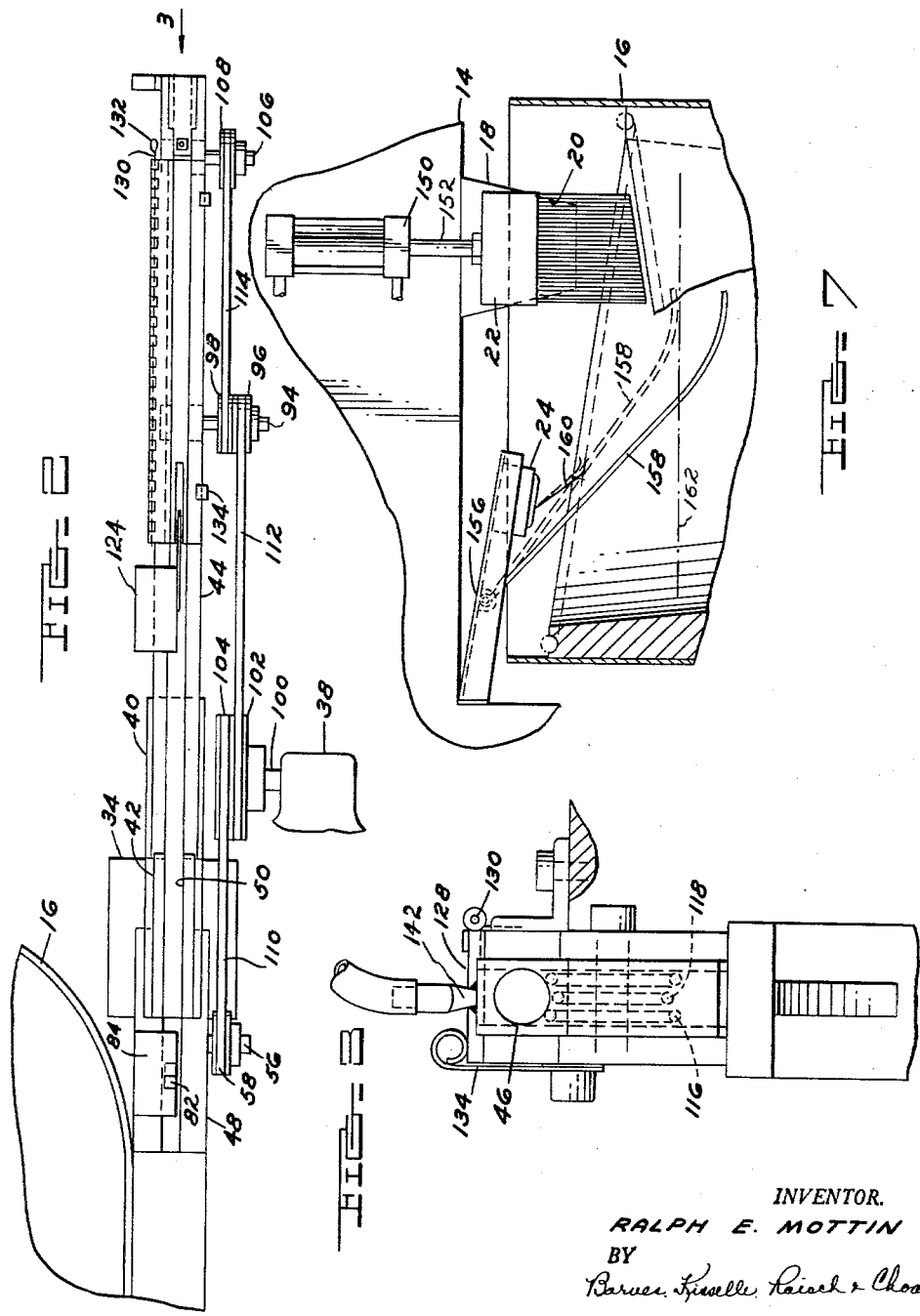

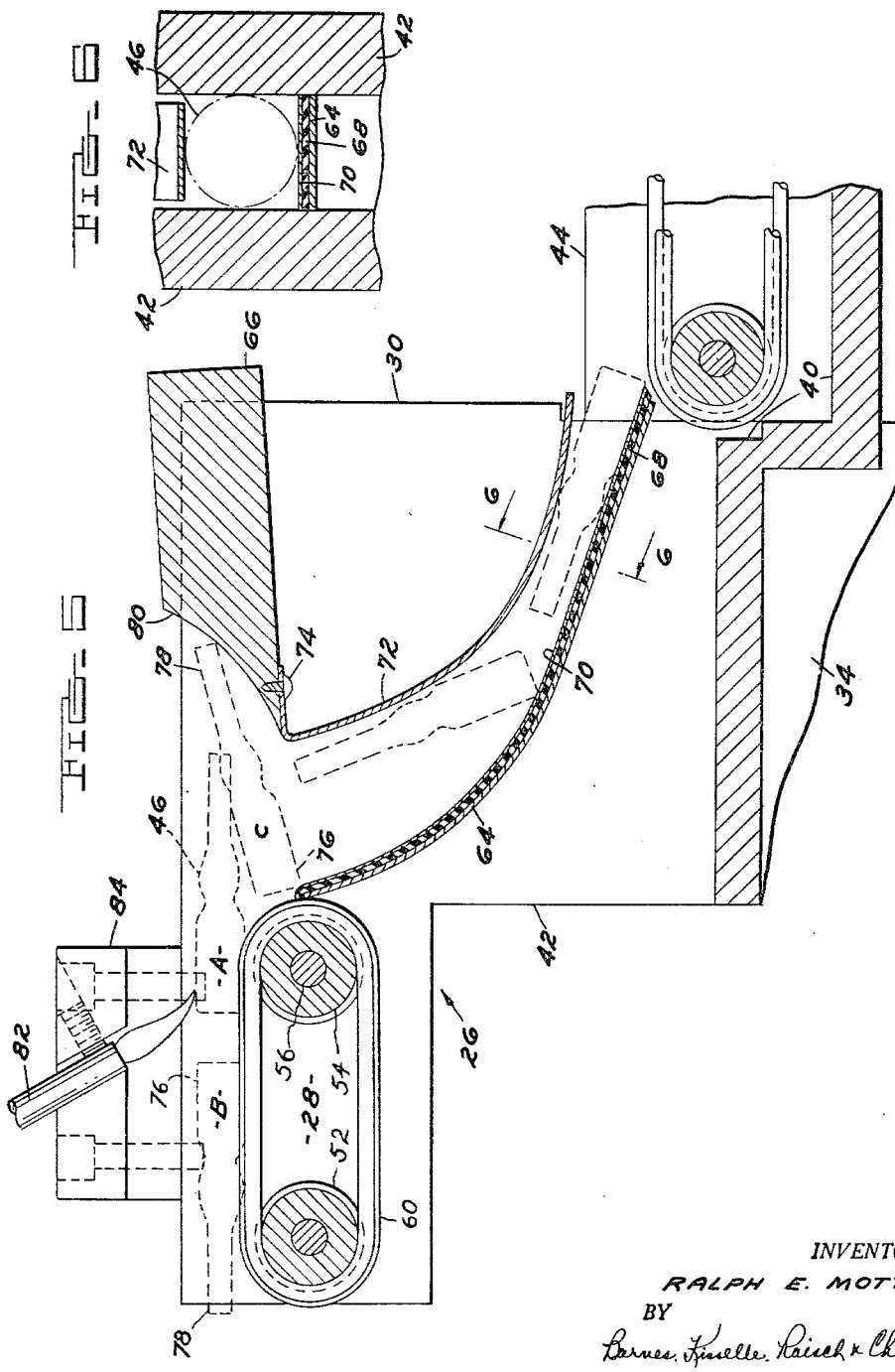

United States Patent Office 3,216,631
Patented Nov. 9, 1965

3,216,631
AUTOMATIC FEEDER MECHANISM FOR ORIENTING RELATIVELY SMALL ARTICLES
Ralph E. Mottin, Taylor, Mich., assignor to Parke, Davis & Company, Detroit, Mich., a corporation of Michigan
Original application Nov. 16, 1959, Ser. No. 853,354. Divided and this application June 11, 1963, Ser. No. 293,921
4 Claims. (Cl. 222—504)

This application is a division of my co-pending application Ser. No. 853,354, filed Nov. 16, 1959, now Patent No. 3,106,281, and entitled "Automatic Feeder Mechanism for Orienting Relatively Small Articles."

This invention relates to a conveying system for moving relatively small articles from a random pile or source to a selected operational position in an oriented and sequential manner. More particularly, this invention relates to an automatic feeder mechanism for transferring a supply of relatively small articles onto a conveyor or similar means in the proper sequence.

The automatic feeder mechanism operates to transfer a supply of relatively small articles such as ampoules, bottles, metal parts, glass or plastic envelopes, electronic tubes, electric light bulbs, or similar small articles from a random pile to a conveyor in sequential, oriented, end-to-end fashion at a greater speed than with conventional methods presently employed. This automatic operation is accomplished without jamming, piling, breaking, spilling, marking or otherwise injuring any of the articles.

This invention will be discussed in its application to automatically transferring ampoules utilized in the pharmaceutical industry although it should be understood that the invention is readily adaptable to handling other relatively small articles.

The feeder mechanism permits the ampoules to be transferred automatically from a random pile to an oriented and sequential position on the conveyor mechanism associated therewith. In addition, the feeder mechanism requires no special attention except for occasional and infrequent loading of the supply hopper. Heretofore, the services of two operators have been required for continuously feeding the conveyor line.

It is therefore an object of the present invention to provide an automatic feeder mechanism for transferring relatively small articles from a random pile to a conveyor in a sequential and oriented manner.

It is another object of the invention to provide an automatic feeder mechanism which takes a single row of ampoules from a random pile and positions the ampoules in proper sequential alignment on a conveyor or similar means from where the ampoules are utilized in subsequent processing operations.

Still another object of the invention is to provide an orientator for aligning ampoules in the proper end-to-end position on a conveyor wherein the orientator utilizes shock absorbing means for cushioning the ampoules.

A further object of the invention is to provide automatic means for feeding a conveyor, said means including means for taking the ampoules from a random pile and placing the ampoules in a single row, and means for imparting a velocity to the non-oriented ampoules to align them in the proper sequence on the adjacent conveyor.

A still further object of the invention is to provide automatic means for transferring ampoules from a random pile to a transfer station such as a conveyor, said automatic means including means for placing the ampoules in a single row in a random manner, and belt means for imparting a velocity to the non-oriented ampoules to place the ampoules in the proper oriented and sequential alignment on the conveyor.

Another object of the invention is to provide an automatic feeder mechanism which includes an orientator having a lip element or member projecting into the ampoules' path of travel and belt means for imparting a velocity to the non-oriented ampoules so that the ampoules engage the lip element and align themselves on the adjacent conveyor in the proper end-to-end position.

Still another object of the invention is to provide a conveying system which includes automatic feeder means for orienting articles being transferred from a random pile to a loader or to other means and a switch associated with the conveying system to automatically terminate the ampoule flow through the feeder means upon jamming or back-up of the ampoules in the system.

A further object of the invention is to provide brush means which includes relatively soft fibers or hairs at selected positions in the conveying system for preventing breakage of the ampoules and aligning the ampoules on the adjacent conveyor.

A still further object of the invention is to provide an improved electrical-pneumatic control circuit for regulating the flow of ampoules from a supply hopper to a vibratory bowl, said supply hopper opening automatically when the level of ampoules in the bowl drops below a predetermined level.

Another object of the invention is to provide an automatic feeder mechanism for a conveying system which lends itself admirably to applications for handling relatively small articles and where reliability in operation, economical and simplicity of construction and minimum of maintenance are essential.

Other objects will become apparent as this description proceeds, especially in connection with the accompanying drawings, wherein:

FIG. 1 is an elevational view of the conveying system which includes the feeder mechanism;

FIG. 2 is a top view of the conveying system shown in FIGURE 1;

FIG. 3 is a right end view of the conveying system;

FIG. 4 is a sectional view taken on line 4—4 of FIGURE 1;

FIG. 5 is an enlarged sectional elevational view showing the automatic feeder mechanism in FIGURE 1;

FIG. 6 is a sectional view taken on line 6—6 of FIGURE 5 of an ampoule sliding down the chute of the feeder mechanism;

FIG. 7 is a partial view of the control switch mechanism used for controlling the flow of ampoules between the supply hopper and the vibratory bowl;

FIG. 8 is a schematic diagram of the pneumatic control circuit;

FIG. 9 is an optional construction of a device for holding the ampoules in contact with the drive belt.

FIG. 10 is a side view of the device shown in FIG. 9;

FIG. 11 is a front view of the holding member shown in assembled position in FIGURE 9.

FIG. 1 shows ampoules being fed at the left of the conveying system 10 and traveling therethrough to the right to a loader 12 or to other means which form no part of the present invention. To the furthermost left of FIG. 1 is located the mechanism shown in FIG. 7. A supply hopper 14 is mounted directly above a vibratory feeder bowl 16 by separate support means not shown. The supply hopper 14 is rectangular in shape and is open at the top. The ampoules are periodically placed by an operator at random in the supply hopper 14. The ampoules are fed to the vibratory feeder bowl 16 through a truncated box 18 which has an open end 20 for discharging the ampoules therethrough into the feeder bowl 16. The open end 20 of the box 18 is controlled by a brush 22 consisting of relatively soft fibers, hairs or a relatively light, yieldable solid material. The brush 22 is movable in the plane of the open end 20 to control the flow of ampoules therethrough. When the ampoules in the feeder bowl 16 have reached a predetermined level an electrical switch 24 is operated which moves the brush 22 upwardly to expose the open end 20 to the feeder bowl 16 and permits the ampoules to freely flow from the supply hopper 14 to the bowl 16. The flow of ampoules is accomplished by gravity forces and by the supplementary vibratory forces which are transmitted from the feeder bowl 16 to the framework of the supply hopper 14. In effect, the hopper 14 vibrates at a very low amplitude. The specific structure for carrying out this operation will be explained in detail later in the specification.

It is sufficient to say at this time that a single row of ampoules having a mixture of oriented and non-oriented ampoules is continuously fed by the vibratory feeder bowl 16 to the automatic feeder mechanism designated by the numeral 26. It is old in the art to utilize a vibratory bowl for feeding a conveyor. However, no automatic means independent of the feeder bowl were provided for aligning the ampoules in the proper end-to-end sequence on the conveyor.

The conveying system 10 may be divided into various sections for discussion purposes only. These sections include the automatic feeder mechanism 26 which utilizes a drive section 28 and an orientator 30. In addition, the conveying system 10 includes the conveyor 32.

The conveying system 10 is supported by suitable support means which are not completely shown in the drawings. The support means raises the system 10 to a predetermined distance above the ground. A support structure or base 34 is schematically shown in FIGS. 1 and 2 for supporting an electric motor 36. Mounted on the motor 36 at right angle thereto is a gear head 38 which is schematically shown in FIG. 2. The gear head 38 is driven by the motor 36 and in turn drives the belt mechanism for the drive section 28 and the conveyor 32 as will be explained in detail later in the specification.

Mounted on the support base 34 is a common support bracket 40 which is offset as is illustrated in FIGS. 1 and 5 to hold a pair of upwardly extending guide members 42 which form part of the orientator 30 previously mentioned. In addition, the support bracket 40 holds the pair of longitudinally extending conveyor rails 44 which form part of the conveyor 32.

The guide members 42 are spaced parallel to each other at a distance slightly in excess of the width of an ampoule 46. A pair of parallel side plates 48 which form part of the drive section 28 are spaced to provide a center groove 50, as is shown in FIG. 2. The plates 48 are notched intermediate their ends to provide cut-away portions which engage the guide members 42 on their inner ends and on the outer sides thereof as is best illustrated in FIG. 2. Fastening means, not shown, secure the plates 48 to the guide members 42.

A pair of pulleys 52 and 54 are mounted in the center groove 50 between the side plates 48 at a relatively short distance apart. The pulley 54 has a shaft 56 which extends through a side plate 48. The shaft 56 has a pulley 58 mounted thereon. An endless contoured belt 60 is placed in the center groove 50 around the pulleys 52 and 54. The contoured belt 60 may be composed of three rubber O-rings 62 placed so as to provide a slight U-shaped cross section like the belt shown in FIGURE 4 to be hereinafter described, or a horizontal cross section.

The center groove 50 will be used to designate the entire longitudinally extending groove of the conveying system 10 including the groove provided between the guide members 42 and the conveyor rails 44. A chute 64 usually made of metal connects the belt 60 with the conveyor 32 as is shown in FIGS. 1 and 5. A lip element or orienting member 66 is mounted between the guide members 42 and projects inwardly into the center groove 50 to a predetermined selected position.

The chute 64 has shock absorbing means loosely placed thereon or means above the chute for preventing the ampoules from turning over when passing through the orientator 30. The shock absorbing means comprise an inner rubber layer 68 and an outer layer of Teflon 70 as is shown in FIGS. 5 and 6. The rubber layer 68 and Teflon layer 70 are bonded together. Utilizing the rubber and Teflon in the manner specified has produced several advantages. The rubber 68 absorbs the energy or cushions the impact of the falling ampoules 46 as they pass through the groove 50 between side plates 48. The Teflon 70 provides a sliding surface which has a low coefficient of friction to permit the ampoules 46 to travel downwardly on the chute 64 at a proper speed. The shock absorbing means is usually connected only at the top portion of the chute 64 to prevent unnecessary movement and displacement of the cushion.

When the feeder mechanism is transferring filled ampoules, chute 64 may be made from a plastic material, such as a nylon or Teflon, thereby eliminating the requirement of separate shock absorbing means. The plastic chute will absorb the energy of the falling filled ampoules but generally is not suitable for relatively small empty ampoules.

Another optional construction as shown in FIGS. 1 and 5 may be utilized instead of the rubber and Teflon shock absorbing means. A suitably contoured spring steel member 72 is positioned in the groove 50. The spring member 72 is mounted at 74 to the bottom of the lip member 66. The spring member 72 prevents the ampoules 46 from unnecessary bouncing, cocking, or jamming and insures that the speed of the ampoules 46 will not be excessive.

The ampoules 46 under consideration are shown in full size in FIG. 5. The cylindrical ampoules 46 are about two inches in length. Each ampoule has a large end 76 and a small end 78. By referring to FIG. 5, it is obvious that the center of gravity of the ampoule 46 is located closer to the large end 76 rather than to the small end 78. The positioning of the lip 66, which has a concave upper surface 80, depends on the location of the center of gravity of the article under consideration. As mentioned previously, the ampoules 46 are fed at random from the vibratory feeder bowl 16. In other words, either the large end 76 or the small end 78 could be leading. The function of the automatic feeder mechanism 26 is to orient the ampoules 46 into the proper end-to-end position prior to the ampoules 46 entering the conveyor 32. In the present case, it is important to have the large end 76 enter the conveyor 32 before the small end 78. In FIG. 5 there are shown ampoules 46 marked "A" and "B." Ampoule A has to be aligned so that the large end 76 enters the conveyor 32 before the small end 78. A soft camel hair brush 82 is mounted in a holder 84 which is located above the side plates 48. The brush 82 is inclined to the ampoules traveling under the brush 82 so as to provide an effective holding action. The brush 82 helps to prevent breakage and jamming of the ampoules 46 and holds the large end of the ampoules 46 in friction contact with the belt 60 at the place where the ampoules 46 are ejected from the end of the belt 60. Such a situation is shown in FIG. 5. It is obvious that the brush 82 is subject to fatigue and wear and therefore an optional construction may be utilized which will be explained later on in the specification. Since there is friction contact between the belt 60 and the glass ampoule A, the belt 60 imparts a velocity to ampoule A. As a result, ampoule A is driven outwardly with the small end 78 moving upwardly on the concave surface 80 of the lip member 66 until the large end 76 has cleared the belt 60. Gravity pulls the ampoule A down the chute 64.

However, when the large end 76 of an ampoule 46 is leading the small end 78, as is represented by ampoule B in FIG. 5, the center of gravity clears the end of the belt 60 prior to the large end 76 engaging the surface 80.

Therefore, gravity pulls the large end 76 downwardly without engaging the surface 80.

Mounted in the groove 50 formed by the rails 44 are longitudinally spaced pulleys 86, 88, 90 and 92. Pulleys 86 and 88 form one pair, while pulleys 90 and 92 form the other pair of pulleys. Pulley 90 has a shaft 94 which extends outwardly through the rail 44 and which has mounted thereon pulleys 96 and 98. Bearings (not shown) are utilized to support the various pulley shafts.

The gear head 38 has a driving shaft 100 which has pulleys 102 and 104 mounted thereon. Pulley 92 has a shaft 106 which has a pulley 108 mounted thereon. A rubber belt 110 drivingly connects the driven pulley 104 with the pulley 58 which in turn drives the belt section 28. A belt 112 drivingly connects driven pulley 102 with pulleys 96 and 98. In addition thereto, a belt 114 drivingly connects the pulley 98 with the pulley 108. The surface speed of the belts are generally the same.

A pair of O-rings or metal extension springs 116 are placed around the outer pulleys 86 and 92 with the pulleys 88 and 90 functioning as idlers. The middle O-ring 118 is split and divided into two sections. An endless O-ring 118 is placed around the pulleys 86 and 88 while another one forms an endless belt around the pulleys 90 and 92. The O-rings may be modified so as to split the two outer rings and utilize a continuous middle ring in the same manner specified above. Dividing the O-rings into sections helps to prevent sagging of the belt and accumulation of broken chips. Utilizing spring belts has eliminated the problem of broken glass chips cutting the belts.

It is very important when moving relatively small and irregularly shaped articles to maintain the articles in the proper end-to-end sequence without jamming, piling or breaking any of the articles. The contoured belt shown in cross-section in FIGS. 3 and 4 was designed to provide a concave center groove in which the small end of the ampoules ride. A belt contour is necessary to prevent the ampoules from locking or wedging themselves together. Such a situation is possible since the small cylindrical end of the lagging ampoule could lock itself with the large cylindrical trailing end of the immediate preceding ampoule unless means were provided to keep the articles in an in-line position. The problem is more acute when filled ampoules are involved because of the greater inertia of the heavier ampoules. The grooved concave belt aligns the ampoules so that the small ends ride in the outer groove and thereby maintains the ampoules in the proper end-to-end sequence. The grooved belt is thereby effective to prevent side to side contact between the ampoules.

A hard bristle poster brush 120 is located in a holder 122 mounted above the rails 44. The brush 120 has a plurality of relatively soft fibers or hairs which are utilized to prevent jamming of the ampoules. The brush 120 eliminates cocking of the ampoules 46 at high speeds thereby preventing jamming and pile up of the ampoules 46 in the conveyor 32.

A conventional type of electrically operated switch 124 is mounted in the conveyor 32. A contact arm 126 extends into the path of travel of the ampoules moving through the conveying section 32. Upon jamming or backing-up of the ampoules 46 the contact arm 126 is raised and actuated so that a signal is fed from the switch 124 to the vibratory feeder bowl 16. This in turn closes the supply of ampoules 46 to the automatic feed mechanism 26 until corrective measures have been applied or until the backed-up ampoules have been fed out to the conveyor 148 through the loading mechanism 12.

A plastic cover 128, as best shown in FIG. 4, is pivotally mounted on one of the guide rails 44. The cover 128 prevents unnecessary bouncing and cocking of the ampoules at certain higher speeds. In addition, the cover prevents overlapping of the small end of the following ampoule with the large end of the leading ampoule. Thus, walking up of one ampoule on another ampoule is prevented. The cover 128 is hingedly connected to one of the rails 44 by a hinge pin 130 which has an outer loop 132 on one end thereof so as to provide means for readily removing the pin 130 when conditions warrant removal of the cover 128. A pair of spring clip assemblies 134 are secured to the outer side of the other guide rail 44 and have flexible loop portions 136 which hold the cover 128 in a closed position. Means are also provided for opening the cover 128 after the flexible spring portions 136 have been released. The opening means include a piston 138 located in the rail 44 and a spring 140 acting against the larger end of the piston 138 in a direction tending to open the cover 128. The use of a cover 128 is required only when it is necessary to prevent the ampoules 46 from cocking or bouncing.

At the outer end of the conveyor 32 is located a jet nozzle or orifice 142 which is connected to a suitable source of air. The purpose of the orifice 142 is to impart the ampoules 46 at the end of their travel a sufficient velocity so that the ampoules 46 will readily clear the conveyor 32 without jamming or breaking. Such an arrangement facilitates rapid loading or filling of the transfer mechanism 12. The conveyor belt does not push the ampoules 46 into the transfer mechanism 12 fast enough to prevent the ampoules 46 from jamming. The orifice 142 is connected in the pneumatic circuit shown in FIG. 8. The pressurized air floats the ampoules 46 off the bottom of the metal plate 143 located adjacent to the belt and thereby reduces the friction between the plate 143 and ampoules. This permits the ampoules to be forceably ejected.

As previously mentioned, the ampoules 46 may be blown from the conveyor 32 into a loader 12 or similar apparatus for handling the ampoules in subsequent processing operations. The loader 12 shown at the right of FIG. 1 is associated with a pair of guide rails 144 and 146 located at right angles to the conveyor 32. The guide rails 144 and 146 are at different elevations and support a conveying mechanism 148 which moves parallel to the rails. The conveying mechanism 148 carries the ampoules 46 side by side from the loader 12 to subsequent operations.

Referring to FIGS. 7 and 8, there is shown a cylinder 150 which is attached to the hopper 14. The brush 22 is attached to a piston and rod 152 which is movable in the cylinder 150. A spring 154 biases the piston 152 and brush 22 in a downward direction to prevent flow of ampoules 46 from the open side 20 of the box 18 to the vibratory feeder bowl 16. A support bracket 156 is connected to the bottom of the hopper 14 and has connected thereto the switch 24 previously discussed. In addition thereto, the bracket 156 has an adjustable control arm or paddle 158 which extends into the bowl 16. The switch 24 has also an actuating lever 160 which projects into the bowl 16. When the level of the bowl 16 is at the proper desired elevation as represented by the line 162 in FIG. 7, the lever 158 shown in dotted lines is in contact with the lever 160 of the switch 24. When the level of the ampoules in the vibratory bowl 16 drops, the lever 158 falls. When the lever 158 moves away from the lever 160, the switch 24 is actuated. This in turn feeds an electrical signal to the valve 164 as is shown in the electrical-pneumatic circuit of FIG. 8. The electrical signal shifts the valve 164 so as to direct air to the lower end of cylinder 150. The air in turn acts on the piston 152 to overcome the force of the spring 154 and move the brush 22 upwardly, thereby opening the side 20 of the box 18 to permit ampoules 46 to flow from the hopper 14 to the feeder bowl 16. When the level 162 has again been obtained the paddle 158 acts upwardly against the control lever 160 to close the switch 24 which in turn closes the valve 164. The spring 154 returns the piston 152 and brush 22 to a closed position.

The source of air in the circuit shown in FIG. 9 may be represented by the numeral 166 which is in turn controlled by the manual valve 168. The air initially passes through a filter 170. The main flow path divides into two paths at T 172, namely pipes 174 and 176. Air is continuously supplied through pipe 176 to the orifice 142 which is utilized to eject the ampoules 46 from the end of the conveyor 32. An adjustable pressure regulator device 178 maintains the requisite pressure at the orifice 142. Pipe 174 delivers air to the valve 164 for the specific purpose heretofore discussed. It should be realized that other devices may be operated by connection with the pneumatic circuit shown in FIG. 9.

An optional holding device for keeping the ampoules 46 in contact with the drive belt 60 is shown in FIGS. 9-11. This device may be used in place of the brush means 82, previously described, which is subject to fatigue and wear. The holding device is designated by numeral 180 and consists of a holder 182 mounted on top of the side plates 48 and a "hold down" member 184 inserted in the device 182 in the inclined opening 186 formed therein. Fastening means 188 secures the member 184 in its proper position.

A pair of longitudinal threaded holes 189 are usually provided in the holder 182 in which is inserted appropriate fastening means (not shown) for securing the holder 182 to the side plates 48.

The hold down member 184 has a groove or slit 190, as shown in FIGURE 11, slightly larger in width than the small cylindrical end 78 of the ampoule 46. With the small end leading, the neck of the ampoule 46 may rotate in the slit 190. However, the large cylindrical end 76 is prevented from doing so because of the beveled guide means 192 which holds the large end 76 in contact with the belt 60, and gradually pulls the small end 78 into a horizontal position on the belt so that the ampoule 46 may pass beyond the device 180. With the large end leading, the guide means 192 holds the ampoule 46 in contact with the belt 60 until the larger end 76 has cleared the belt 60. At this point the small end 78 may rotate in the slit 190 as the ampoule 46 begins to fall down the chute 64.

The drawings and the foregoing specification constitute a description of the improved automatic feeder mechanism for orienting relatively small articles in such full-clear, concise and exact terms as to enable any person skilled in the art to practice the invention, the scope of which is indicated by the appended claims.

What I claim as my invention is:

1. A pneumatic device for controlling the flow of relatively small and breakable articles between a supply hopper having a vertical discharge opening and a bowl positioned under said hopper comprising, a cylinder mounted on said hopper, a rod having a piston on one end which is vertically movable in said cylinder and door means on the other end of said rod positioned for opening and closing said discharge opening in response to upward and downward movement respectively of said piston in said cylinder, said door means consisting of a brush having relatively soft fibers disposed with their free ends extending downwardly to thereby prevent breakage of the articles in said hopper, said hopper including a downwardly inclined gravity discharge chute having an end edge disposed in a vertical plane defining said vertical discharge opening, said brush being positioned for vertical bodily movement in said plane such that the free ends of said fibers move past the lowermost portion of said end edge of said chute during travel of the brush between the open and closed positions thereof.

2. Apparatus for supplying relatively small and breakable articles such as glass ampoules or the like comprising a vibratory feeder having a bowl with a central area for receiving the articles and means for conveying the articles from the receiving area, a supply hopper for containing a quantity of the articles mounted above said feeder bowl having a gravity discharge chute extending downwardly therefrom toward the receiving area of the feeder bowl, said discharge chute having a vertical discharge opening at the lower end thereof, a brush having relatively soft flexible fibers adapted to cover said discharge opening to block passage of the articles therethrough, means for moving said brush between an open position wherein the free ends of said fibers clear the opening and a closed position wherein said fibers close said opening, a control arm having a free end extending into the receiving area of the bowl and adapted to rest on the articles contained therein, means movably supporting said arm such that the vertical position of the free end of the arm is determined by the quantity of articles in the bowl, and a control switch operably connected to said brush moving means and to said arm such that downward movement of the arm below a predetermined level in response to a diminishing supply of articles in the bowl actuates said switch to thereby cause said brush moving means to move the brush to said open position and thereby allow the articles to be discharged from the hopper via said discharge opening into the bowl and such that upward movement of the arm to a predetermined level in the bowl in response to replenishment of the articles actuates said switch to cause the said brush moving means to move said brush to said closed position and thereby cut off the supply of articles from the hopper.

3. The combination set forth in claim 2 wherein said brush moving means vertically reciprocates said brush between the open and closed positions thereof and said brush is disposed for vertical bodily movement with the free ends of said fibers extending downwardly therefrom.

4. The combination set forth in claim 3 wherein said brush moving means comprises a cylinder mounted on said hopper, a rod having a piston on an upper end of the rod reciprocable in said cylinder and having said brush secured to a lower end of said rod, a spring in said cylinder for biasing said rod downwardly to urge the brush downwardly toward its closed position, and pneumatic supply means including a supply line connected to said cylinder for pneumatically urging the piston upwardlly therein to raise the brush to its open position and a valve in said supply line operably connected to said switch to admit air to said cylinder in response to said switch being actuated by downward movement of said control arm and vice versa.

References Cited by the Examiner

UNITED STATES PATENTS

| 2,703,190 | 3/55 | Muller | 222—504 X |
| 2,723,782 | 11/55 | Dwyer | 222—504 X |
| 2,965,268 | 12/60 | Bauerlein | 222—504 X |

FOREIGN PATENTS 491,434   3/54   Italy.

LOUIS J. DEMBO, *Primary Examiner.*

RAPHAEL M. LUPO, *Examiner.*